(12) United States Patent
Baek (10) Patent No.: US 8,259,154 B2
(45) Date of Patent: Sep. 4, 2012

(54) MOBILE TERMINAL AND METHOD OF CREATING MULTIMEDIA CONTENTS THEREIN

(75) Inventor: Doo Sup Baek, Yongin-si (KR)

(73) Assignee: LG Electronics Inc., Seoul (KR)

( * ) Notice: Subject to any disclaimer, the term of this patent is extended or adjusted under 35 U.S.C. 154(b) by 1101 days.

(21) Appl. No.: 12/165,237

(22) Filed: Jun. 30, 2008

(65) Prior Publication Data

US 2009/0015653 A1    Jan. 15, 2009

(30) Foreign Application Priority Data

Jul. 12, 2007    (KR) .................... 10-2007-0070021

(51) Int. Cl.
*H04N 7/14*    (2006.01)
(52) U.S. Cl. ............... 348/14.02; 348/14.08; 348/14.09
(58) Field of Classification Search .... 348/14.01–14.03, 348/14.05, 14.07, 14.08–14.09, 14.15, 21
See application file for complete search history.

(56) References Cited

U.S. PATENT DOCUMENTS 5,550,754 A    8/1996    McNelley et al.
8,063,929 B2 *  11/2011  Kurtz et al. ............... 348/14.08
2004/0110545 A1  6/2004  Kim
2005/0018050 A1  1/2005  Yaji et al.

FOREIGN PATENT DOCUMENTS

| EP | 1 631 084 A2 | 3/2006 |
| EP | 1 755 292 A2 | 2/2007 |
| WO | WO 99/57900 | * 11/1999 |

* cited by examiner

*Primary Examiner* — Suhan Ni
(74) *Attorney, Agent, or Firm* — Birch, Stewart, Kolasch & Birch, LLP (57) ABSTRACT

A mobile terminal including a camera configured to capture a first video image of a user using the mobile terminal, a wireless communication unit configured to wirelessly communicate with at least one other terminal, an audio output module configured to output currently played music, a display configured to display at least one of the first image of the user using the mobile terminal and a second video image of a user using said at least one other terminal during a video communication call operation between the mobile terminal and the at least one other terminal, a user input unit configured to input a key signal requesting a music video be created, and a controller configured to create a music video file including at least one of the first video image and the second video image together with the currently played music if the key signal requesting the music video be created is input during the video communication call operation.

26 Claims, 7 Drawing Sheets

MOBILE TERMINAL AND METHOD OF CREATING MULTIMEDIA CONTENTS THEREIN

The present application claims priority to Korean Patent Application No. 10-2007-0070021, filed on Jul. 12, 2007, which is hereby incorporated by reference as if fully set forth herein.

BACKGROUND OF THE INVENTION

1. Field of the Invention

The present invention relates to a mobile terminal and corresponding method for creating multimedia contents therein. More particularly, the present invention relates to a mobile terminal and corresponding method for creating a music video using images displayed on the mobile terminal during a video calling operation.

2. Discussion of the Related Art

Mobile terminals now provide many additional services beside the basic call service. For example, user's can now access the Internet, play games, watch videos, listen to music, capture images and videos, record audio files, perform video calls, etc. Mobile terminals also now provide broadcasting programs such that user can watch television shows, sporting programs, videos, etc.

Further, users can now conduct video calls with each other using services such as SKYPE and MSN Messenger. However, the provided video services are very basic and do not allow the user much flexibility related to the displayed video information.

SUMMARY OF THE INVENTION

Accordingly, one object of the present invention is to address the above-noted and other drawbacks.

Another object of the present invention is to provide a mobile terminal and corresponding method for creating multimedia contents using images displayed on the mobile terminal during a video calling operation.

To achieve these objects and other advantages and in accordance with the purpose of the invention, as embodied and broadly described herein, the present invention provides in one aspect a mobile terminal including a camera configured to capture a first video image of a user using the mobile terminal, a wireless communication unit configured to wirelessly communicate with at least one other terminal, an audio output module configured to output currently played music, a display configured to display at least one of the first image of the user using the mobile terminal and a second video image of a user using said at least one other terminal during a video communication call operation between the mobile terminal and the at least one other terminal, a user input unit configured to input a key signal requesting a music video be created, and a controller configured to create a music video file including at least one of the first video image and the second video image together with the currently played music if the key signal requesting the music video be created is input during the video communication call operation.

In another aspect, the present invention provides a method of controlling a mobile terminal, which includes capturing, via a camera included with the mobile terminal, a first video image of a user using the mobile terminal, outputting currently played music, displaying at least one of the first video image of the user using the mobile terminal and a second video image of a user using said at least one other terminal during a video communication call operation between the mobile terminal and the at least one other terminal, conditionally receiving a key signal requesting a music video be created, and creating a music video file including at least one of the first video image and the second video image together with the currently played music if the key signal requesting the music video be created is received during the video communication call operation.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6(*a*)-6(*d*) are overviews of display screens illustrating a method of creating a music video according to an embodiment of the present invention;

DETAILED DESCRIPTION OF THE INVENTION

Reference will now be made in detail to the preferred embodiments of the present invention, examples of which are illustrated in the accompanying drawings.

Figure 1:
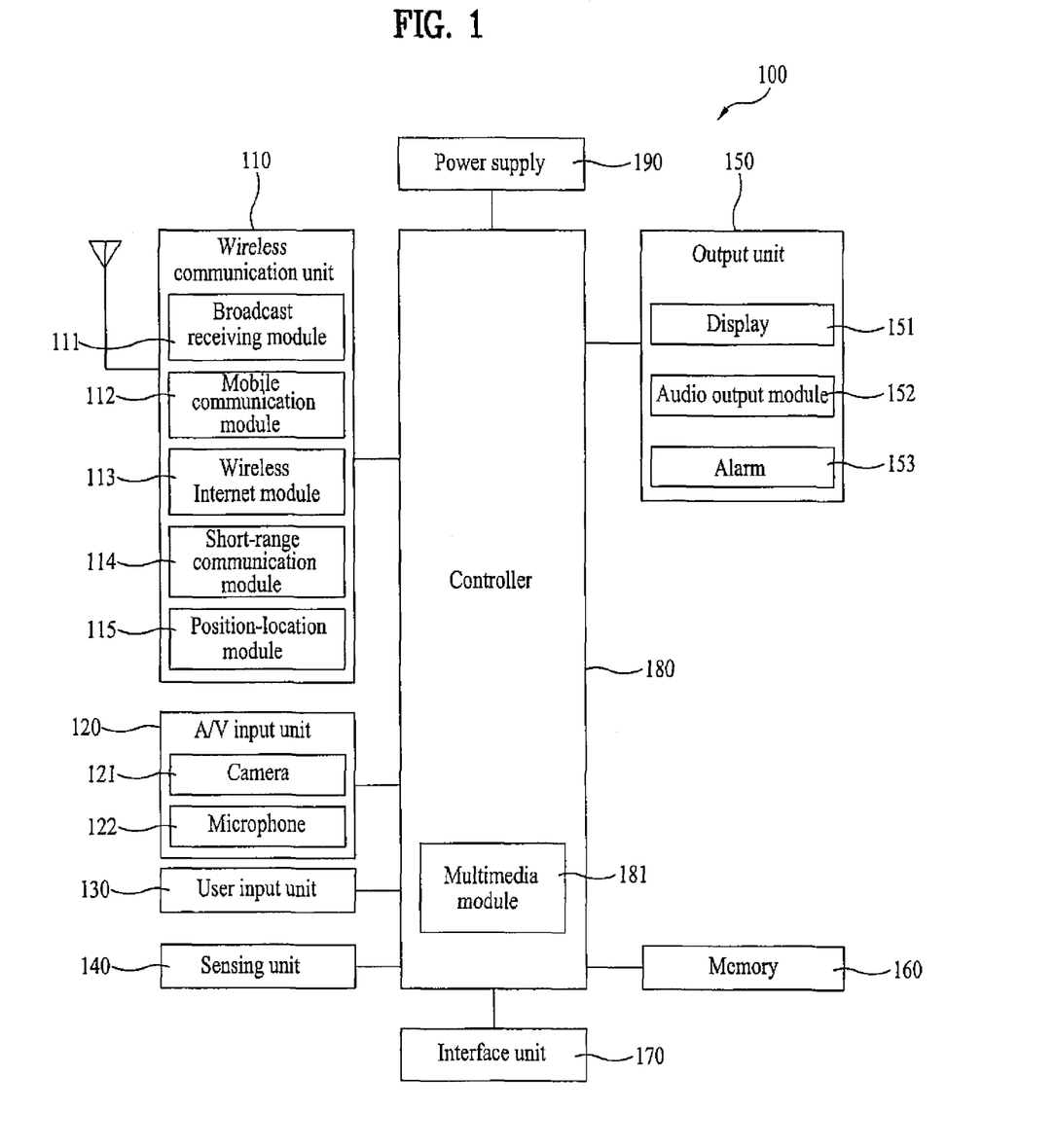
FIG. 1 is a block diagram of a terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast-receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/Video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 can be implemented to couple the mobile terminal 100 with external devices. Examples of external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152, which supports the audio output requirements of the mobile terminal 100. The audio output module 152 can be implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Examples of events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
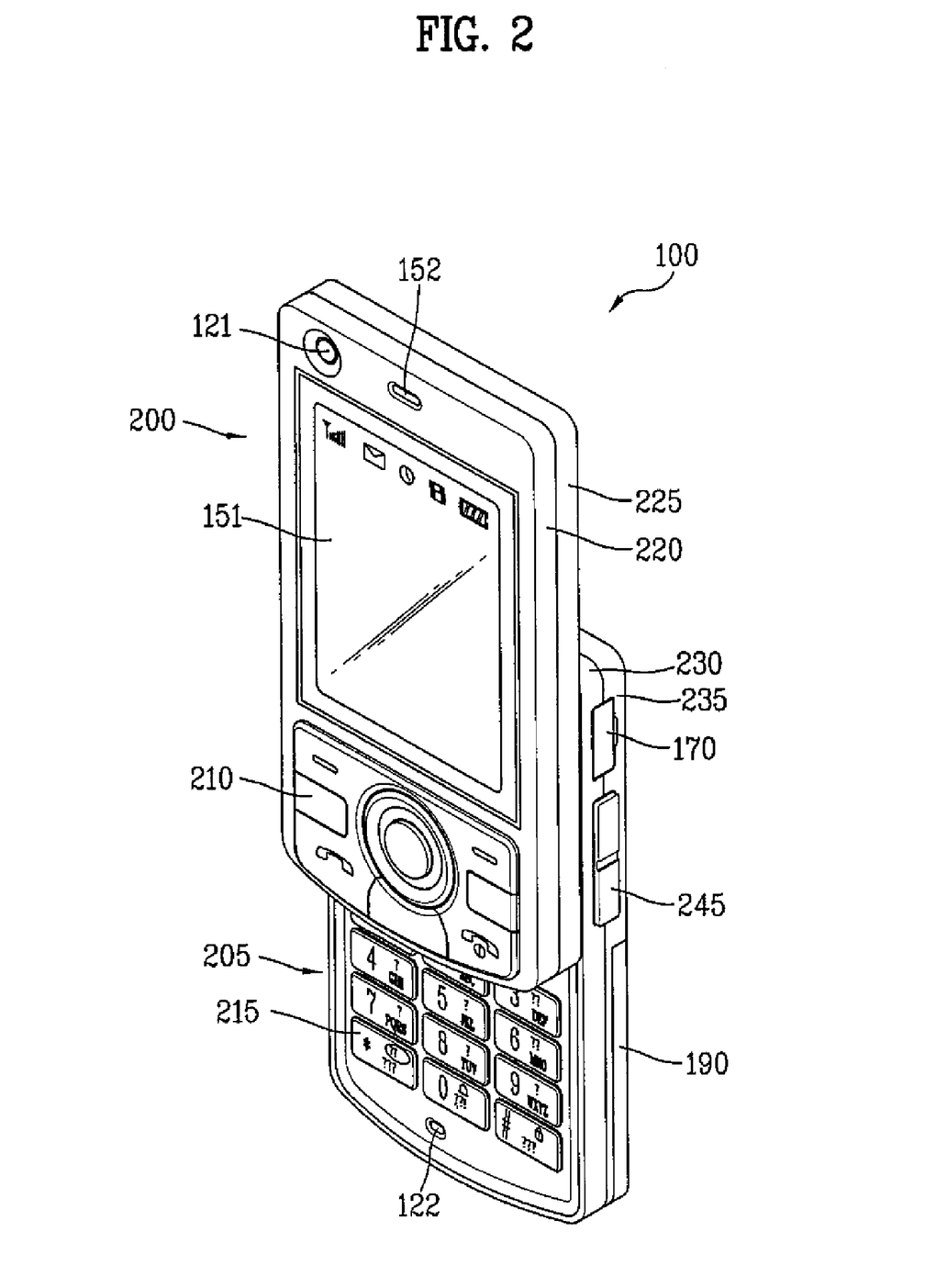
FIG. 2 is a front perspective view of a terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
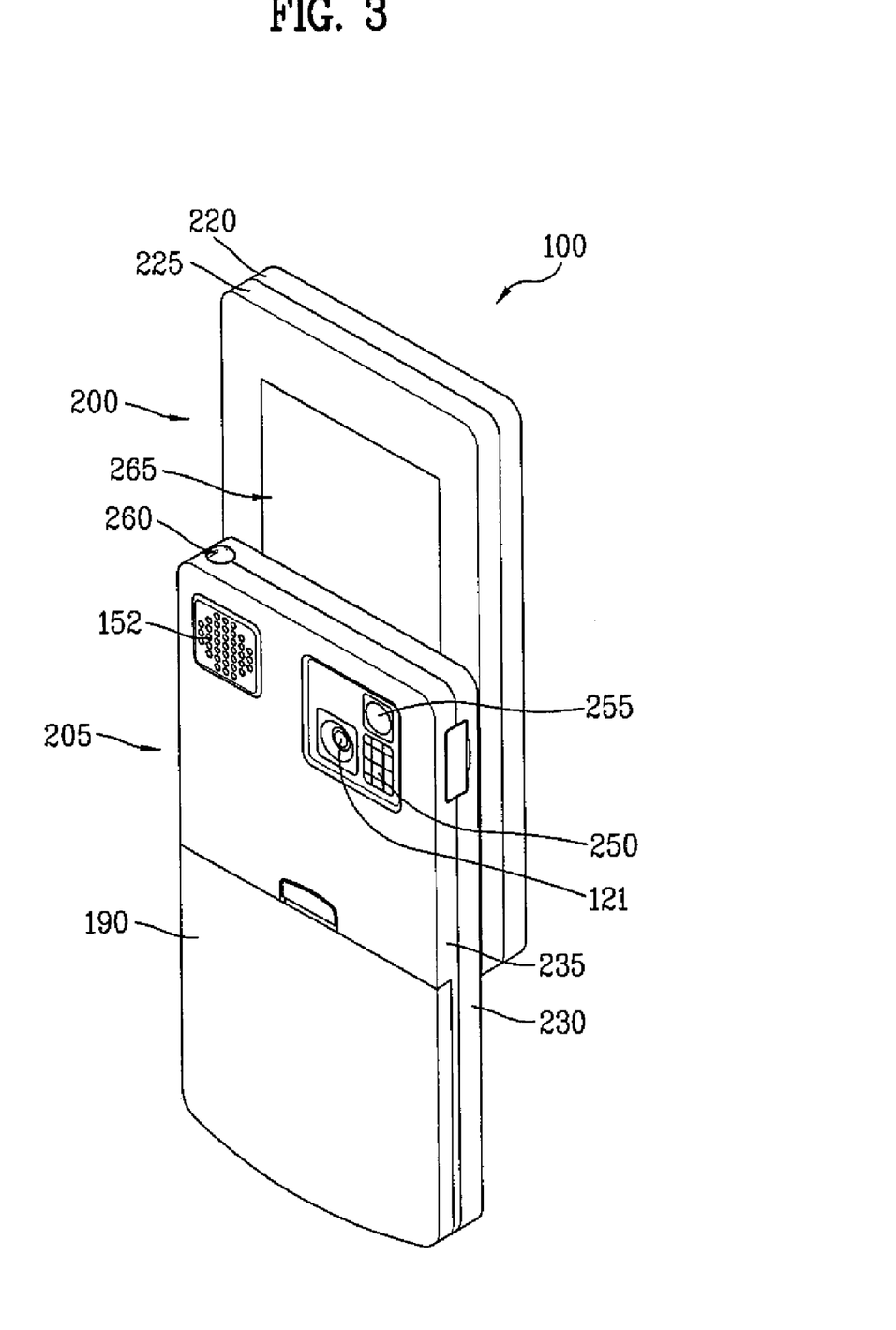
FIG. 3 is a rear perspective view of the terminal shown in FIG. 2 according to an embodiment of the present invention.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
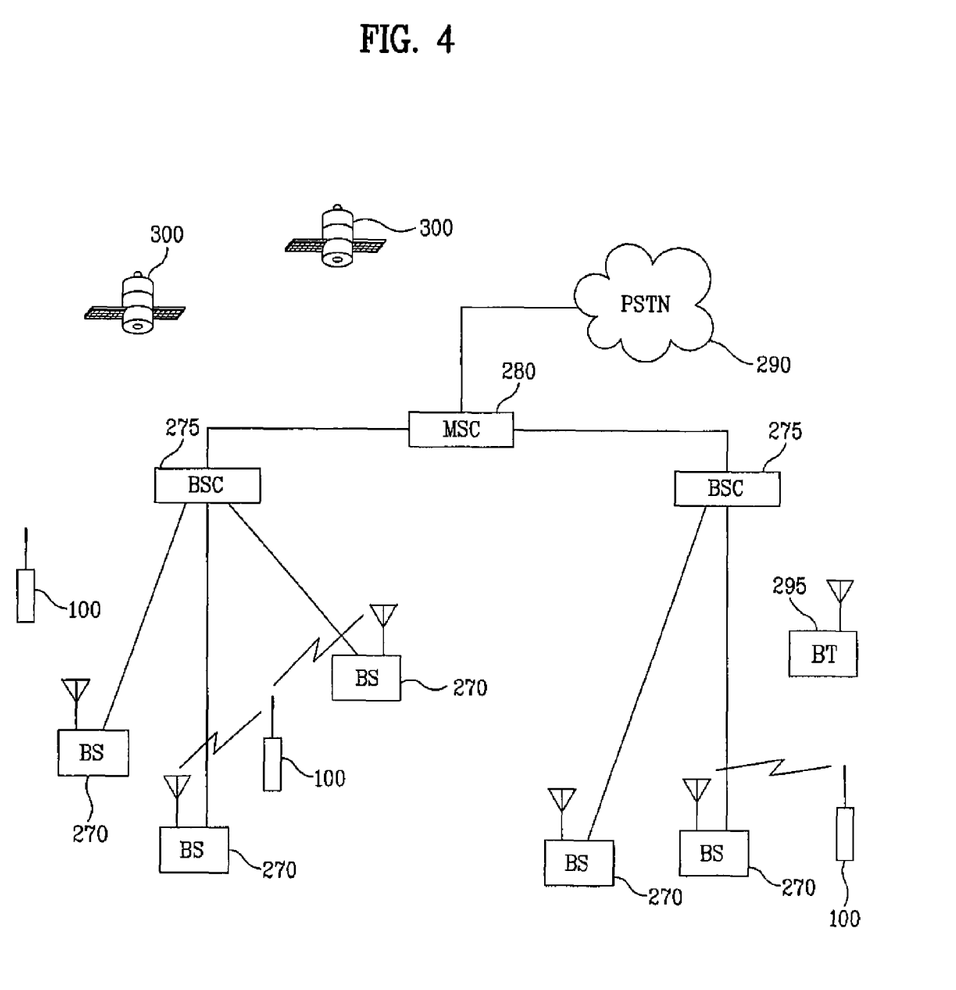
FIG. 4 is a block diagram of a CDMA wireless communication system operable with the terminal of FIGS. 1 to 3 according to an embodiment of the present invention.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during a general operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

Figure 5:
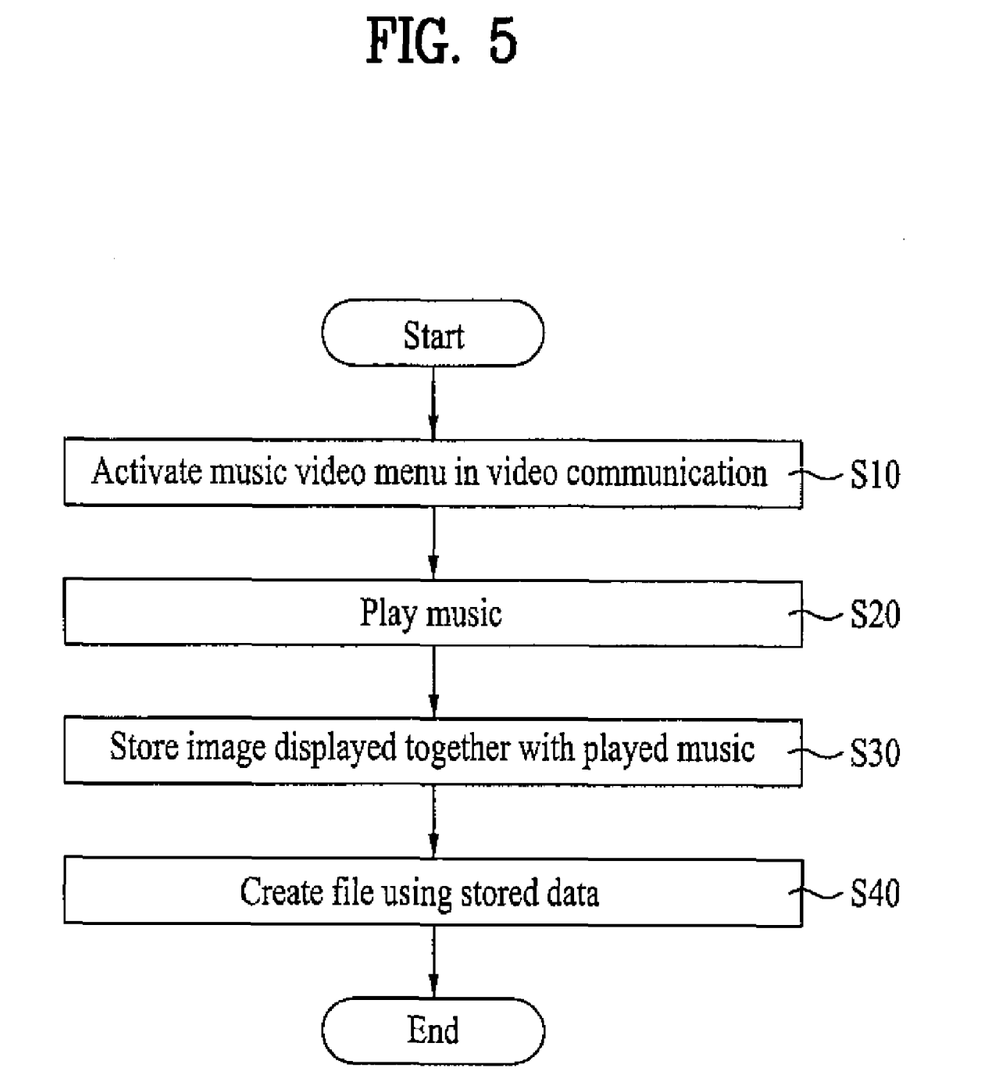
FIG. 5 is a flowchart illustrating a method of creating multimedia contents in a mobile terminal according to one embodiment of the present invention.

Next, FIG. 5 is a flowchart illustrating a method of creating multimedia contents in a mobile terminal according to one embodiment of the present invention. In particular, FIG. 5 is a flowchart illustrating a method of creating a music video in the course of a video communication call. FIG. 1 will also be referred to in this description.

Referring to FIG. 5, while the user is conducting a video call with another party (or multiple parties), the user can input a key signal in order to create a desired music video (S10). For example, the user can manipulate a particular key of the user input unit 130. The particular key can also be set as a "hot key" that when manipulated automatically initiates the music video creation process. Further, selection of the music video creation key results in the controller 180 activating a music video menu. The user can also touch a menu button or other icon on the touch screen to begin activating the music video creation process. Other input methods are also applicable.

Then, as shown in FIG. 5, when the music video menu is activated, the user can select a particular background music that is to be played in the created music video (S20). In more detail, the background music may be a music file stored in the memory 160 of the terminal, a music file received from an external server, etc. For example, the user can request a file that exists on an external server (e.g., ITUNES) that he or she wants to use as the background music for the video.

Then, the controller 180 stores an image or images that are displayed during the video communication call together with the played music (S30). For example, the image(s) stored together with the music may be an image of the user who initiates the call, an image of the user being called, or both images of the calling and called users.

After the images and music are stored, the controller 180 creates a moving picture file (e.g., music video) using the stored data (S40). Further, the controller 180 can first display captured images of the user and/or correspondent user and then provide the user with options to decide if the user wants to create the music video. The controller 180 then makes a single moving picture file by combining the displayed image(s) of the user and/or correspondent user with the selected background music to thereby create the music video.

Figure 6:
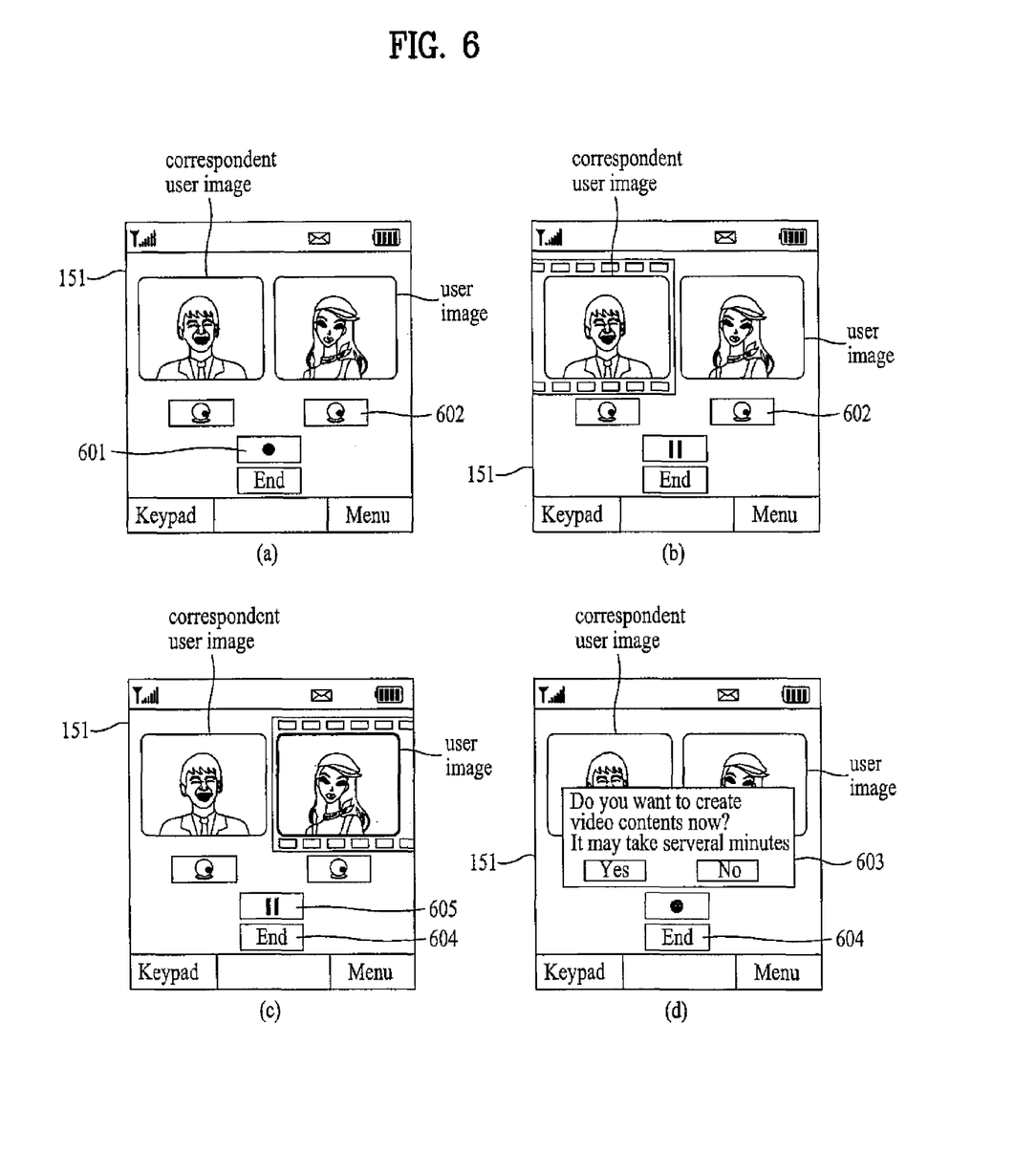

Next, FIGS. 6(*a*) to 6(*d*) are display screens illustrating a method of creating a music video during a video communication call. As shown in FIG. 6(*a*), the female user is conducting a video call with a male user. The images of both users are also displayed on the terminal. That is, as shown in FIG. 6(*a*), during the video call, the users of both parties are displayed.

In addition, this description assumes the user has manipulated the music video creation function, which is illustrated in FIG. 6(*a*) via the icon 601. That is, the icon 601 illustrates to the user that the music video creation process has been started. Further, the user can also select a particular song that is to be played with the captured images. The icon 602 indicates a video communication call is being performed.

Although not shown in detail in FIG. 6(*a*), the user can select a particular song or music to be played with the music video using the appropriate menu options provided on the terminal. For example, the user can first select a song using the multimedia player options on their terminal, or may start the video creating process while they are already listening to a particular song. The controller 180 then uses the currently playing song or music as the background music for the created music video.

The controller 180 can also display a list of music files stored on the terminal when the user activates the music video creating process and the user can select any of the displayed music videos. Also, if the terminal has a voice activation feature, the user can request a particular song or music by speaking into the terminal.

Other selection methods are also possible. For example, the user can set a default background music to be used for a particular user they are calling. In this example, the controller 180 stores a particular music file with a particular user based on the user's selection, and then when the music video process is started, the controller 180 refers to the stored information to determine which default song to select based on what user is being called. The controller 180 can also inform the user that the default background music is being selected and allow the user to override the default selection, and select another song or music as the background music.

Further, the controller 180 can also play the selected music while the video images shown in FIG. 6(*a*) are displayed. That is, when the user selects a song to be played as background music and then initiates the video music process, the controller 180 can play the music while the images are displayed as shown in FIG. 6(*a*). The user can then touch the music video capturing key 601 displayed on the display 151 to store the background music with the correspondent user (i.e., the person she is calling). As discussed above, both users can also be stored together with the selected background music.

Thus, as shown in FIG. 6(*b*), when the user selects the music video capturing key 601, the correspondent user images are stored together with the played music. Namely, the correspondent user images are captured as a music video. Further, as shown in FIG. 6(*b*), the correspondent user's image is highlighted so that the user can see that the correspondent user's image is being captured together in the music video. That is, in this example, the correspondent user's image is highlighted to have a film shape. Other highlighting methods are also possible. For instance, the fringe of the captured image can be displayed by flickering or the captured image can be distinguishably displayed through different colors.

Further, the controller 180 can also display the captured images of the correspondent user such that that the user who is creating the music video can change the order of the captured images and make a comical video of the correspondent user. In this embodiment, the user can select particular frame images that have been captured and are displayed by the controller 180 on the touch screen, and then drag (cut and paste) image frames from one location to another in the sequence of video frames.

Further, as discussed above, the controller 180 can be commanded to capture both of the correspondent user's image as well as the user's image. For example, the user can touch her display image in FIG. 6(*b*), and then the controller 180 begins capturing images of the user as shown in FIG. 6(*c*). In addition, similar to the embodiment in FIG. 6(*b*), the controller 180 highlights the image being captured for the music video.

Thus, in this embodiment, the controller 180 stores images of both users along with the selected background music. Further, the controller 180 can be commanded via the appropriate menu options to store the captured images in a particular order. For example, because the correspondent user's image was first captured followed by the user's image, the controller 180 can store the correspondent user's image first followed by the users image in a sequential manner. Therefore, when the user plays the created music video, the correspondent user's image would be first displayed followed by the user's image. The images may also be stored in the reverse order.

In another embodiment, the controller 180 can prompt the user to select a particular order in which the captured images are displayed. In addition, rather than touching the actual display image of the user (or correspondent user), the user can select the appropriate camera icon 602 displayed below the corresponding user.

Thus, as described above, the user can freely select what images are to be displayed together with the background music. For example, the user can select only the correspondent user's image to be displayed while the background music is played, or to select both images of the user and correspondent user. The user can also select that only her images are captured to create a music video. The user can easily select the corresponding images by simply touching a respective image that is to be created with the background music or by selecting the appropriate camera icon 602.

Thus, the user can store one or two images (user image and correspondent user image) together with the played music. Also, in this instance, both fringes of the user image and the correspondent user image can be highlighted (e.g., as film shapes). The user is then made aware of which images are being stored with the background music.

Therefore, as mentioned in the foregoing description, if either the user image or the correspondent user image is stored together with the played music or both of the user image and the correspondent user image are stored together with the played music, the mobile terminal 100 is able to display information about a status for currently stored images to a user of the mobile terminal. That is, the terminal 100 displays information about what images are being stored together with the selected background music.

Further, rather than highlighting particular images that are being captured for making the music video, the controller 180 can also display a plurality of different indicators. For instance, the controller 180 can display a first indicator indicating that the correspondent user's image is being captured, a second indicator indicating that the user's image is being captured, and a third indicator indicating that both of the user's image and the correspondent user's image are being captured. This is particularly advantageous because during the video creation process, the controller 180 can transmit the indicator(s) to the correspondent user's terminal such that the correspondent user can know which image is being captured.

Further, the image used in creating the music video may include a real or alternate image of a user. In addition, when the controller 180 has completed storing the image or images, the controller 180 can output a message to the user that the music video will be created. This feature is shown in FIG. 6(d).

In more detail, as shown in FIG. 6(d), the controller 180 displays information in a window 603 asking the user if he or she wants to create the music video. Then, if the user selects the 'Yes' option displayed in the window 603, the controller 180 creates the music video file and then stores the created music video file in the memory 160.

In addition, rather than storing the created music video, the controller 180 can first play the created music video file and then prompt the user to determine if they want to store the created music video. Also, rather than displaying the popup window 603, the controller 180 can also output a voice instruction asking the user if they want to create the music video.

It is also possible that the controller 180 not display the popup window 603 or output a message, but rather immediately create the music video file after the user selects the end button 604 (shown in FIGS. 6(c) and 6(d)). The user can also select a pause button 6051 which causes the controller 180 not to capture the displayed video image during the time the pause button 605 is selected. In this way, the user can select particular image segments of the video call to be created with the music video. The user can instruct the controller 180 to again begin capturing the displayed image(s) by again selecting the pause button 605.

Figure 7:
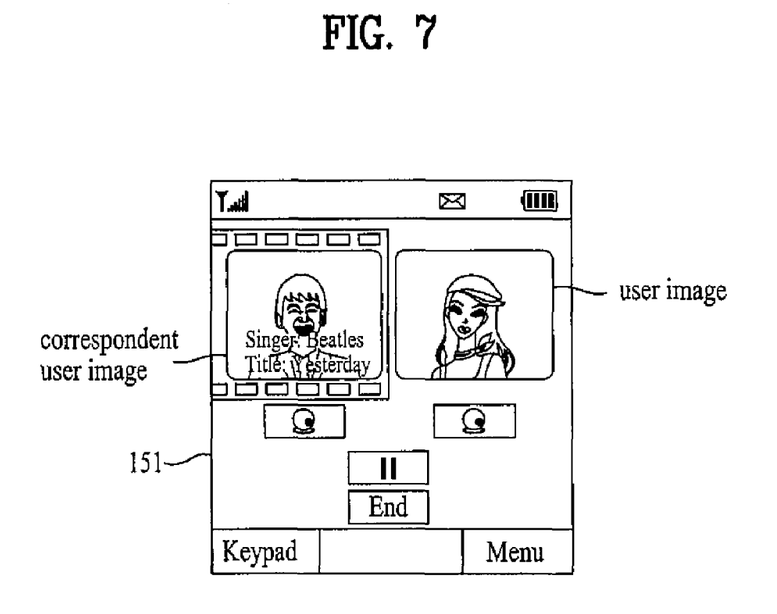
FIG. 7 is an overview of a display screen illustrating text being added to a created music video according to an embodiment of the present invention.

In addition, it is also possible to display text, an icon, an emoticon, etc. together with the displayed images of the users conducting the video call. For example, FIG. 7 is an overview of a display screen illustrating text being displayed together with the image of the correspondent user's image. For example, and as shown in FIG. 7, the user is singing the song "Yesterday" by the Beatles, and thus the text corresponding the title of the song and the band's name can be displayed on top of the correspondent user's image.

The text can be added by the user typing text on a keypad, for example. Further, FIG. 7 illustrates the text being displayed on top of the correspondent user's image, but the text can also be input separately from the displayed image. For example, after the music video is created, the user may desire to add particular data to the created music video. Thus, the user could at this time enter the text that is to be displayed together with the music video.

Alternatively, rather the user typing in the text that is to be displayed with the captured images, it is also possible that the controller 180 recognize the voice (in this instance, the song) that is being sung, and automatically display the text corresponding to the recognized voice. In addition, rather than text, a different image or icon can be displayed together with the image of the user. For example, an emoticon of hands clapping could be displayed on the image of the user singing in FIG. 7. The user can select the different emotions or other characters via the appropriate menu options provided by the terminal of the present invention.

In addition, according to yet another embodiment of the present invention, the music video file created by the above-explained method can be used as an alternate image in video communication. That is, the user can create a music video including images of a person they previously had a video conversation with, and then substitute their own image with the created music video when conducting another video call with the same person. Thus, the user being called will see the created music video (which they may have not known was created—i.e., the controller 180 was instructed not to transmit the above-described indicators). Therefore, the user is given great flexibility in creating music videos that can be used separately after the music video is created.

Further, the user can also transmit or share the music video they created with other uses. For example, the user can transmit a created music video using MMS, e-mail or the like. For example, FIG. 8 is an overview of a display screen illustrating a user transmitting a created multimedia contents file according to an embodiment of the present invention.

Figure 8:
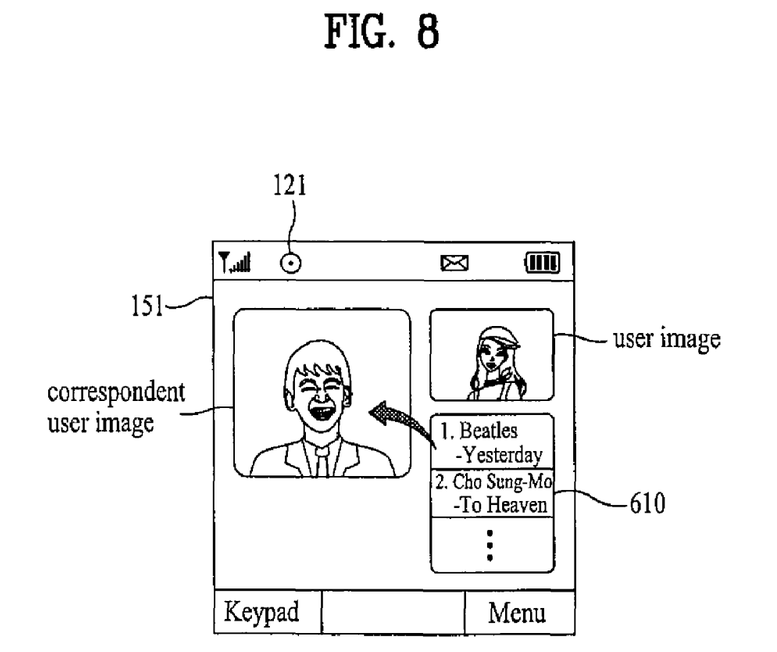
FIG. 8 is an overview of a display screen illustrating a created music video being transmitted to another user according to an embodiment of the present invention.

In more detail, as shown in FIG. 8, the user has selected a particular key or menu option indicating they want to transmit a particular created music video, and the controller 180 displays a window 610 including a list of created music videos. The user can then touch a particular music video in the window 610, and drag the touched music video into the area of an image of the user they want to transfer the music video to (in this example, the user is selecting the Beatles music video created in FIG. 7 to be transmitted to the correspondent user).

Therefore, the user can create music videos and other multimedia files using video that occurs during a video call. The user can also transfer the created music videos to other users, and add text or other emoticons to the music videos. Therefore, the users during a video call can have more fun while they are conducting the video call.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
 a camera configured to capture a first video image of a user using the mobile terminal;
 a wireless communication unit configured to wirelessly communicate with at least one other terminal;
 an audio output module configured to output currently played music;
 a display configured to display at least one of the first image of the user using the mobile terminal and a second video image of a user using said at least one other terminal during a video communication call operation between the mobile terminal and the at least one other terminal;
 a user input unit configured to input a key signal requesting a music video be created;
 a controller configured to create a music video file including at least one of the first video image and the second video image together with the currently played music if the key signal requesting the music video be created is input during the video communication call operation; and
 a memory configured to store said at least one of the first and second video images along with the currently played music.

2. The mobile terminal of claim 1, wherein the controller is further configured to create the music video file by alternately storing in the memory the first and second video images along with the currently played music such that when the created music video is played, the first video image is displayed first followed by the second video image.

3. The mobile terminal of claim 1, wherein the controller is further configured to create the music video file by alternately storing in the memory the second and first video images along with the currently played music such that when the created music video is played, the second video image is displayed first followed by the first video image.

4. The mobile terminal of claim 1, wherein the controller is further configured to create the music video file by randomly storing in the memory the first and second video images along with the currently played music such that when the created music video is played, the first and second images video are randomly displayed.

5. The mobile terminal of claim 1, wherein the controller is further configured to create the music video file by substituting an alternate image for at least one of the first and second video images along with the currently played music such that when the created music video is played, the alternate image for at least one of the first and second video images is displayed.

6. The mobile terminal of claim 1, wherein the display further includes a touch screen configured to receive a touch signal correspond to a touching of at least one of the displayed first and video second images, and
wherein the controller is further configured to store in the memory one or both of the first and second video images that are touched in response to the touch signal together with the currently played music so as to create the music video file.

7. The mobile terminal of claim 1, wherein the controller is further configured to highlight one or both of the displayed first and second video images that are being used to create the music video file.

8. The mobile terminal of claim 7, wherein the controller highlights one or both of the displayed first and second video images that are being used to create the music video file by highlighting a fringe or color of the first and second video images.

9. The mobile terminal of claim 1, wherein the controller is further configured to control the wireless communication unit to transmit information to said at least one other terminal indicating whether the second video image of the user using the other terminal is being used to create the music video.

10. The mobile terminal of claim 1, wherein the controller is further configured to output a message requesting the user confirm the music video is to be created before creating the music video.

11. The mobile terminal of claim 1, wherein the controller is further configured to control the wireless communication unit to transmit the stored and created music video to another terminal.

12. The mobile terminal of claim 11, wherein the controller controls the wireless communication unit to transmit the stored and created music video when the stored and created music file is touched and dragged into the second video image of the user.

13. A mobile terminal, comprising:
 a camera configured to capture a first video image of a user using the mobile terminal;
 a wireless communication unit configured to wirelessly communicate with at least one other terminal;
 an audio output module configured to output currently played music;
 a display configured to display at least one of the first image of the user using the mobile terminal and a second video image of a user using said at least one other terminal during a video communication call operation between the mobile terminal and the at least one other terminal;
 a user input unit configured to input a key signal requesting a music video be created; and
 a controller configured to create a music video file including at least one of the first video image and the second video image together with the currently played music if the key signal requesting the music video be created is input during the video communication call operation,
 wherein the input unit is further configured to receive at least one of text and an emoticon that is displayed along with at least one of the first and second video images such that the created music video includes said at least one of the text and emoticon displayed along with said at least one of the first and second video images.

14. A method of controlling a mobile terminal, the method comprising:
 capturing, via a camera included with the mobile terminal, a first video image of a user using the mobile terminal;
 outputting currently played music;
 displaying at least one of the first video image of the user using the mobile terminal and a second video image of a user using said at least one other terminal during a video communication call operation between the mobile terminal and the at least one other terminal;

conditionally receiving a key signal requesting a music video be created;

creating a music video file including at least one of the first video image and the second video image together with the currently played music if the key signal requesting the music video be created is received during the video communication call operation; and storing in a memory said at least one of the first and second video images along with the currently played music.

15. The method of claim 14, wherein the creating step creates the music video file by alternately storing in the memory the first and second video images along with the currently played music such that when the created music video is played, the first video image is displayed first followed by the second video image.

16. The method of claim 14, wherein the creating step creates the music video file by alternately storing in the memory the second and first video images along with the currently played music such that when the created music video is played, the second video image is displayed first followed by the first video image.

17. The method of claim 14, wherein the creating step creates the music video file by randomly storing in the memory the first and second video images along with the currently played music such that when the created music video is played, the first and second video images are randomly displayed.

18. The method of claim 14, wherein the creating step creates the music video file by substituting an alternate image for at least one of the first and second video images along with the currently played music such that when the created music video is played, the alternate image for at least one of the first and second video images is displayed.

19. The method of claim 14, further comprising:

receiving a touch signal correspond to a touching of at least one of the displayed first and second video images, wherein the creating step creates stores in the memory one or both of the first and second video images that are touched in response to the touch signal together with the currently played music so as to create the music video file.

20. The method of claim 14, further comprising:

highlighting one or both of the displayed first and second video images that are being used to create the music video file.

21. The method of claim 20, wherein the highlighting step highlights one or both of the displayed first and second video images that are being used to create the music video file by highlighting a fringe or color of the first and second video images.

22. The method of claim 14, further comprising:

transmitting information to said at least one other terminal indicating whether the second video image of the user using the other terminal is being used to create the music video.

23. The method of claim 14, further comprising:

outputting a message requesting the user confirm the music video is to be created before creating the music video.

24. The method of claim 14, further comprising:

transmitting the stored and created music video to the at least one other terminal.

25. The method of claim 24, wherein the transmitting step transmits the stored and created music video when the stored and created music file is touched and dragged into the displayed second video image of the user using said at least one other terminal.

26. A method of controlling a mobile terminal, the method comprising:

capturing, via a camera included with the mobile terminal, a first video image of a user using the mobile terminal;

outputting currently played music;

displaying at least one of the first video image of the user using the mobile terminal and a second video image of a user using said at least one other terminal during a video communication call operation between the mobile terminal and the at least one other terminal;

conditionally receiving a key signal requesting a music video be created;

creating a music video file including at least one of the first video image and the second video image together with the currently played music if the key signal requesting the music video be created is received during the video communication call operation; and receiving at least one of text and an emoticon that is displayed along with at least one of the first and second video images such that the created music video includes said at least one of the text and emoticon displayed along with said at least one of the first and second video images.

* * * * *